(12) United States Patent
Wang

(10) Patent No.: US 8,340,140 B2
(45) Date of Patent: Dec. 25, 2012

(54) STATISTICAL MULTIPLEXING USING A PLURALITY OF ENCODERS

(75) Inventor: Limin Wang, San Diego, CA (US)

(73) Assignee: General Instrument Corporation, Horsham, PA (US)

(*) Notice: Subject to any disclaimer, the term of this patent is extended or adjusted under 35 U.S.C. 154(b) by 398 days.

(21) Appl. No.: 12/688,514

(22) Filed: Jan. 15, 2010

(65) Prior Publication Data

US 2011/0176562 A1   Jul. 21, 2011

(51) Int. Cl.
*H04J 3/02* (2006.01)
(52) U.S. Cl. ........................................... 370/538
(58) Field of Classification Search .................. 370/464, 370/498, 537, 538
See application file for complete search history.

(56) References Cited

U.S. PATENT DOCUMENTS

| | | | |
|---|---|---|---|
| 6,493,388 B1* | 12/2002 | Wang | 375/240.12 |
| 2005/0219378 A1* | 10/2005 | Kubota et al. | 348/222.1 |
| 2008/0107173 A1* | 5/2008 | van Beek | 375/240.02 |

* cited by examiner

*Primary Examiner* — Omar Ghowrwal
(74) *Attorney, Agent, or Firm* — Thomas A. Ward

(57) ABSTRACT

A plurality of programs are statistically multiplexed using a statistical multiplexing (stat mux) system. $R_{channel}$, a constant total bit rate for the plurality of programs, is determined. $C_{l,Ff,picType}$, a complexity for each picture in the plurality of programs, is determined. $T_{l,Ff,picType}$, a bit allocation for each picture in the plurality of programs, is determined based on $C_{l,Ff,picType}$ and $R_{channel}$. The plurality of programs are encoded using a plurality of encoders, a combined encoder buffer, and $T_{l,Ff,picType}$ to form a plurality of variable bit rate (VBR) compressed bit streams. The plurality of VBR compressed bit streams are multiplexed to form a single constant bit rate (CBR) bit stream.

10 Claims, 9 Drawing Sheets

STATISTICAL MULTIPLEXING USING A PLURALITY OF ENCODERS

BACKGROUND

ITU-T H.264/MPEG-4 part 10 is an international video coding standard, developed by Joint Video Team (JVT) formed from experts of International Telecommunications Union Telecommunication Standardization Sector (ITU-T) Video Coding Experts Group (VCEG) and International Organization for Standardization (ISO) Moving Picture Experts Group (MPEG). ITU-T H.264/MPEG-4 part 10 is also referred to as MPEG-4 AVC (Advanced Video Coding). In MPEG-4 AVC, an interlaced video frame can be structured and coded (i.e., encoded) as a single frame picture in frame mode, or as a two separate field pictures in field mode. MPEG-4 AVC allows adaptive switching between frame and field coding mode per frame. MPEG-4 AVC allows high quality video at lower bit rates without a prohibitive increase in the complexity of applying the standard when compared to previous standards.

Multiple programs are known to be encoded using previous standards and sent over a common channel having a fixed limited bandwidth using a technique known as statistical multiplexing, which may be applied to MPEG-4 AVC. Statistical multiplexing is a type of communication link sharing in which a communication channel is divided into an arbitrary number of variable bit-rate (VBR) digital channels or data streams.

Although statistical multiplexing is beneficial for VBR data streams, statistical multiplexing may not account for an effect of buffer overload on encoders used to statistically multiplex communications and decoders used to de-multiplex the communications for an end user.

SUMMARY

Disclosed herein is a method for statistically multiplexing a plurality of programs, according to an embodiment. In the method, $R_{channel}$, $C_{i,Ff,picType}$, and $T_{i,Ff,picType}$ is determined. $R_{channel}$ is a constant total bit rate for the plurality of programs. $C_{i,Ff,picType}$ is a complexity for each picture in the plurality of programs. $T_{i,Ff,picType}$ is a bit allocation for each picture in the plurality of programs and is determined based on $C_{i,Ff,picType}$ and $R_{channel}$. The plurality of programs are then encoded using a plurality of encoders, a combined encoder buffer having an upper boundary and a lower boundary and $T_{i,Ff,picType}$ to form a plurality of variable bit rate (VBR) compressed bit streams. The plurality of VBR compressed bit streams are multiplexed to form a single constant bit rate (CBR) bit stream.

Also disclosed herein is a statistical multiplexing (stat mux) system for statistically multiplexing a plurality of programs, according to an embodiment. The stat mux system includes a stat mux rate control configured to determine $R_{channel}$, $C_{i,Ff,picType}$, and $T_{i,Ff,picType}$. $R_{channel}$ is a constant total bit rate for the plurality of programs. $C_{i,Ff,picType}$ is a complexity for each picture in the plurality of programs. $T_{i,Ff,picType}$ is a bit allocation for each picture in the plurality of programs, and is determined based on $C_{i,Ff,picType}$ and $R_{channel}$. The stat mux system also includes a plurality of encoders configured to encode the plurality of programs using a combined encoder buffer having an upper boundary and a lower boundary and $T_{i,Ff,picType}$ to form a plurality of VBR compressed bit streams. Further, the stat mux system includes a multiplexer configured to multiplex the plurality of VBR compressed bit streams to form a single CBR bit stream.

Further disclosed is a computer readable storage medium on which is embedded one or more computer programs implementing the above-disclosed method for statistically multiplexing a plurality of programs, according to an embodiment.

As described above, the embodiments provide a method and apparatus for statistically multiplexing a plurality of programs. Embodiments of the invention also provide a method of dynamically assigning bandwidth among the plurality of programs. The embodiments of the invention satisfy a channel condition and enhance reconstructed video quality of each of the programs at end devices. The embodiments of the invention also prevent buffer overload at a combined encoder buffer and at decoder buffers for end devices. A particular program is allowed more bandwidth dependent on complexity. Because sequences of high complexity in a plurality of programs tend to occur at different times, the statistical multiplexing system more effectively distributes bandwidth. Embodiments of the invention provide a method of balancing VBR requirements of each program with capacity requirements of the combined encoder buffer and the decoder buffers of end devices.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

1. Statistical Multiplexing System

Figure 1:
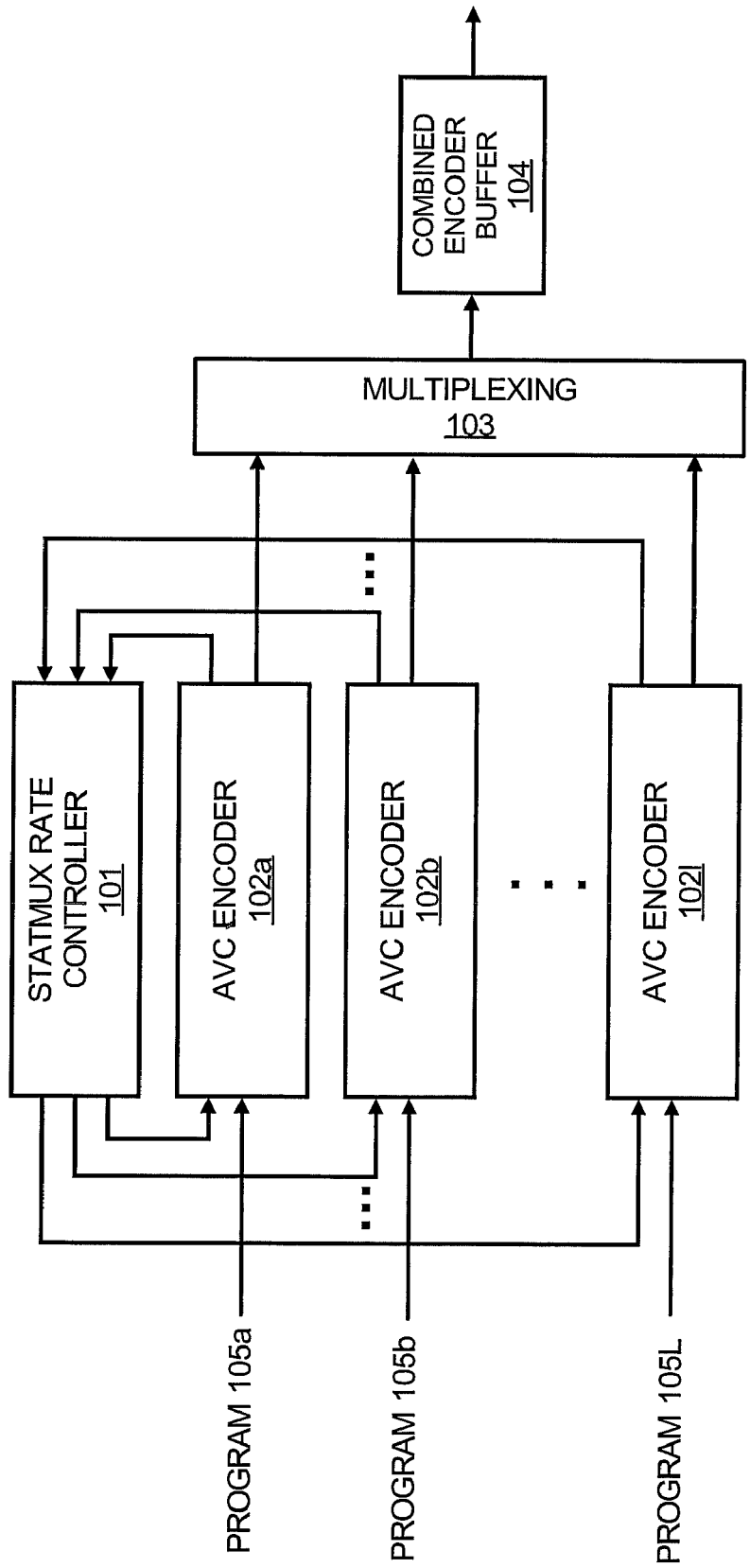
FIG. 1 illustrates a simplified block diagram of a statistical multiplexing system, according to an embodiment.

FIG. 1 illustrates a simplified block diagram of a statistical multiplexing (stat mux) system 100 configured to statistically multiplex a plurality of programs 105a-l. As shown in FIG. 1, the stat mux system 100 includes a stat mux rate controller 101, a plurality of MPEG-4 AVC encoders 102a-l, a multiplexer 103, and a combined encoder buffer 104. It should be understood that the stat mux system 100 depicted in FIG. 1 may include additional components and that some of the components described herein may be removed and/or modified without departing from a scope of the stat mux system 100.

The plurality of MPEG-4 AVC encoders 102a-l may be, for instance, single pass encoders. The plurality of programs 105a-l are input to the stat mux system 100 at the plurality of MPEG-4 AVC encoders 102a-l. Each of the programs 105a-l comprises an input video sequence. The stat mux rate controller 101 determines values to ensure a bit allocation based on a relative complexity for each of the programs 105a-l and ensures that a total bit rate determined for encoding the plurality of programs 105a-l is approximately equal to a constant bit rate (CBR). The plurality of MPEG-4 AVC encoders 102a-l thereafter encode the plurality of programs 105a-l using the values from the stat mux rate controller 101 to form a plurality of variable bit rate (VBR) compressed bit streams. The VBR compressed bit streams are multiplexed using the multiplexer 103 to form a single CBR bit stream. The multiplexer 103 uses the combined encoder buffer to ensure that the single CBR bit stream is output to the channel at a CBR equal to a capacity of the channel.

2. Rate Control in Statistical Multiplexing System

Rate control is an engine that dynamically adjusts encoding parameters so that the resulting compressed bit rate can meet a target bit rate. The stat mux rate controller 101 dynamically manages the bandwidth distribution among the plurality of programs 105a-l to enhance reconstructed video quality of each of the programs 105a-l at end devices, and at the same time, regulates the aggregate bit stream at CBR to satisfy a channel condition. A particular program is allowed more bandwidth dependent on relative complexity in respect to other programs in the plurality of programs 105a-l.

The plurality of programs 105a-l may be at any frame rate, for example, 30 frames per second or 24 frames per second. Each picture of the plurality of programs 105a-l may be encoded in either frame or field mode. Each frame or field picture may be an I, P, Bs or B picture. Pictures are encoded at picture instants.

Each of the plurality of MPEG-4 AVC encoders 102a-l encodes a frame or field picture from the plurality of programs 105a-l within a period equal to, or less than, the reciprocal of the frame rate. For example, for a program at 30 frames per second, an MPEG-4 AVC encoder takes a maximum of ⅟30 seconds to encode a frame picture and a maximum of ⅟60 seconds to encode a field picture. Given a particular program from the plurality of programs 105a-l, the MPEG-4 AVC encoder moves all the compressed bits of the most recently encoded picture into the combined encoder buffer 104 at the picture instant.

Figure 2:
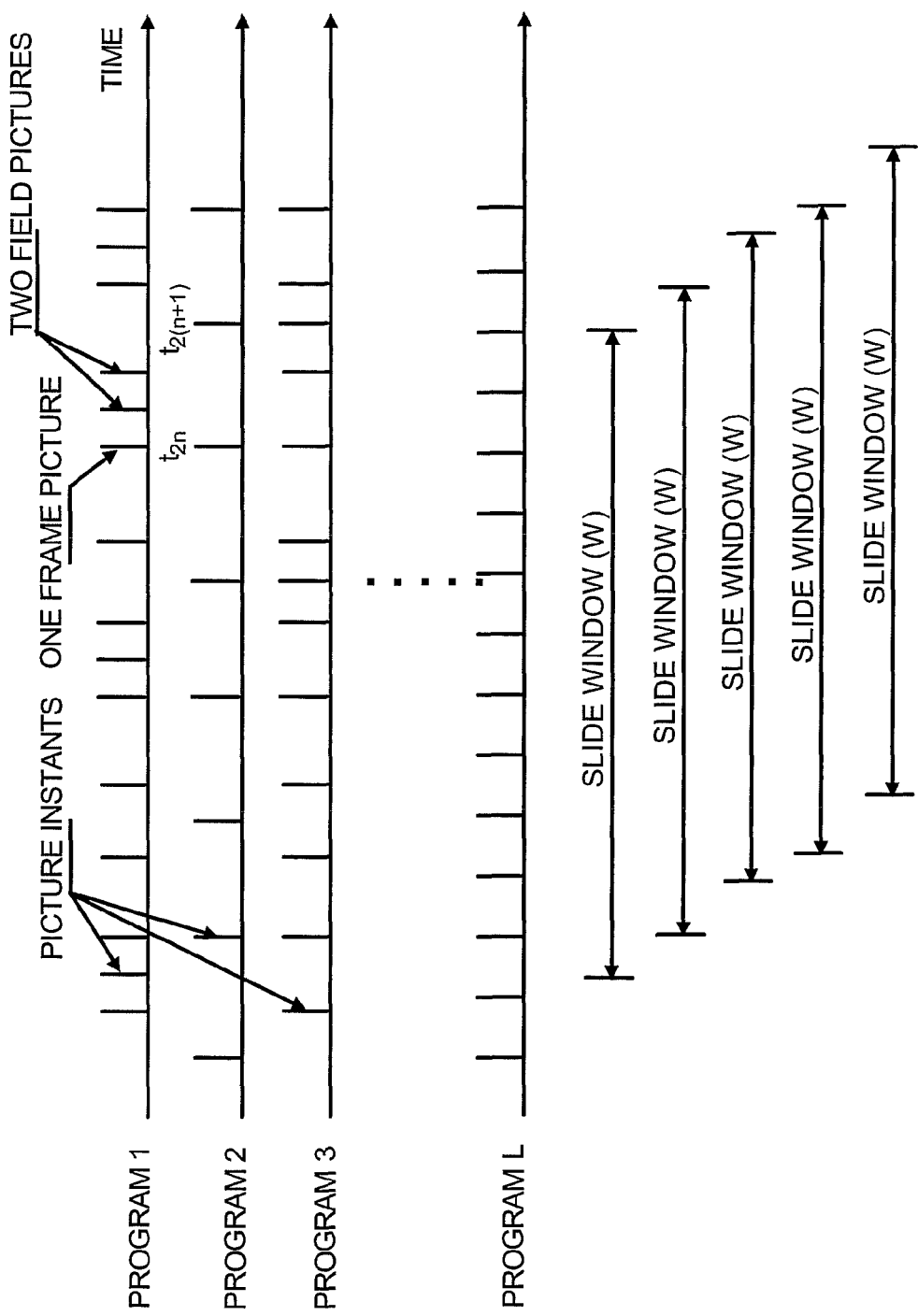
FIG. 2 illustrates a diagram of a sliding window used in encoding a plurality of programs, according to an embodiment.

According to an embodiment, the stat mux rate controller 101 adjusts the bandwidth distribution among the plurality of MPEG-4 AVC encoders 102a-l by applying a sliding window at $t_n$, in which $t_n$ is a current picture instant as shown in FIG. 2. The sliding window has a size of W, measured in seconds. R, an actual number of bits assigned for the sliding window, is initially determined as equal to a nominal number of bits $T_W$, for $t_n < W$. $T_W$ is determined based on W and $R_{channel}$. $R_{channel}$ is a constant total bit rate for the plurality of programs 105a-l. $R_{channel}$ may be a predetermined value dependent on bandwidth of a channel through which the stat mux system 100 sends the plurality of programs 105a-l after encoding and multiplexing the plurality of programs 105a-l. $T_W$ may be determined, for instance, by an equation $$T_W = W \times R_{channel}. \qquad \text{Equation (1)}$$

The sliding window is thereafter slid along a time domain at each picture instant as each picture in the plurality of programs 105a-l is encoded. Each encoded picture is removed from the sliding window. The number of bits for the sliding window, R, may be updated after each picture is encoded using an equation $$R = T_W + \left( T_W - \sum_{t_{n'} \in \{t_n - W, t_n\}} \sum_{l=1}^{L} R_{l,n'} \right), \qquad \text{Equation (2)}$$

in which $R_{l,n'}$ is an actual number of bits generated for a picture of program index l at instant $t_{n'}$, and $R_{l,n'}$ is summed over L programs and over a period from $t_n - W$ to $t_n$. L is a total number of the plurality of programs 105a-l.

The stat mux rate controller 101 determines values used in controlling a bit rate in each of the plurality of MPEG-4 AVC encoders 102a-l including $R_{channel}$, $C_{l,Ff,picType}$, and $T_{l,Ff,picType}$. $C_{l,Ff,picType}$ is a complexity for each picture in the plurality of programs 105a-l. The stat mux rate controller 101 determines a total bit budget for encoding all of the plurality of programs 105a-l using $R_{channel}$. The stat mux rate controller 101 may determine $T_{l,Ff,picType}$, a bit allocation for each picture in the plurality of programs 105a-l, using $C_{l,Ff,picType}$ and $R_{channel}$.

According to an embodiment, the stat mux rate controller 101 encodes the plurality of programs 105a-l using a sliding windows method, as will be described hereinbelow with respect to FIG. 7 and the method 310. $T_{l,Ff,picType}$ in that instance may be determined using an equation $$T_{l,Ff,picType} = \frac{\alpha_{l,Ff} \beta_{l,Ff} \gamma_{l,Ff,picType} C_{l,Ff,picType}}{\sum_{l=1}^{L} \sum_{Ff} \sum_{picType \in} n_{l,Ff,picType}} R \qquad \text{Equation (3)}$$

$$\alpha_{l,Ff} \beta_{l,Ff} \gamma_{l,Ff,picType} C_{l,Ff,picType}$$

in which Ff∈{frame, field} indicates a picture is one of a frame or field picture, picType∈{I, P, $B_s$, B} indicates the picture is of a picture type of I, P, Bs, or B, $n_{l,Ff,picType}$ indicates a number of pictures of picType∈{I, P, $B_s$, B} in Ff∈{frame, field} for program l in the sliding window, $\alpha_{l,Ff}$ is a constant factor for addressing a spatial resolution of program l, $\beta_{l,Ff}$ is a quality weighting factor for program l, and $\gamma_{l,Ff,picType}$ is a constant factor used to compensate for the picture type picType∈{I, P, $B_s$, B} in Ff∈{frame, field} or program l.

The stat mux rate controller 101 also determines updated values for $T_{l,Ff,picType}$ and $C_{l,Ff,picType}$. For instance $C_{l,Ff,picType}$ may be determined using an equation $$C_{l,Ff,picType} = R_{l,n} \times D_{l,n} \qquad \text{Equation (4)}$$

in which $R_{l,n}$ is a number of bits used to encode each picture and $D_{l,n}$ is an associated coding distortion determined from encoding each picture. Alternately $C_{l,Ff,picType}$ may be determined using an equation $$C_{l,Ff,picType} = R_{l,n} \times 2^{\frac{QP_{l,n}-c}{6}} \qquad \text{Equation (5)}$$

in which $R_{l,n}$ is a number of bits used to encode each picture and c is a constant depending upon a $QP_{l,n}$. $QP_{l,n}$ is a quantization parameter.

The multiplexing unit 103 receives the plurality of VBR compressed bit streams from the plurality of MPEG-4 AVC encoders 102a-l. The multiplexing unit 103 thereafter multiplexes the plurality of VBR compressed bit streams to form a single CBR bit stream. The single CBR bit stream formed from the plurality of VBR compressed bit streams is sent to the combined encoder buffer 104 before outputting over the channel. The stat mux rate controller 101 ensures that the single CBR bit stream does not exceed an upper boundary or underflow a lower boundary of the combined encoder buffer 104.

Figure 3:
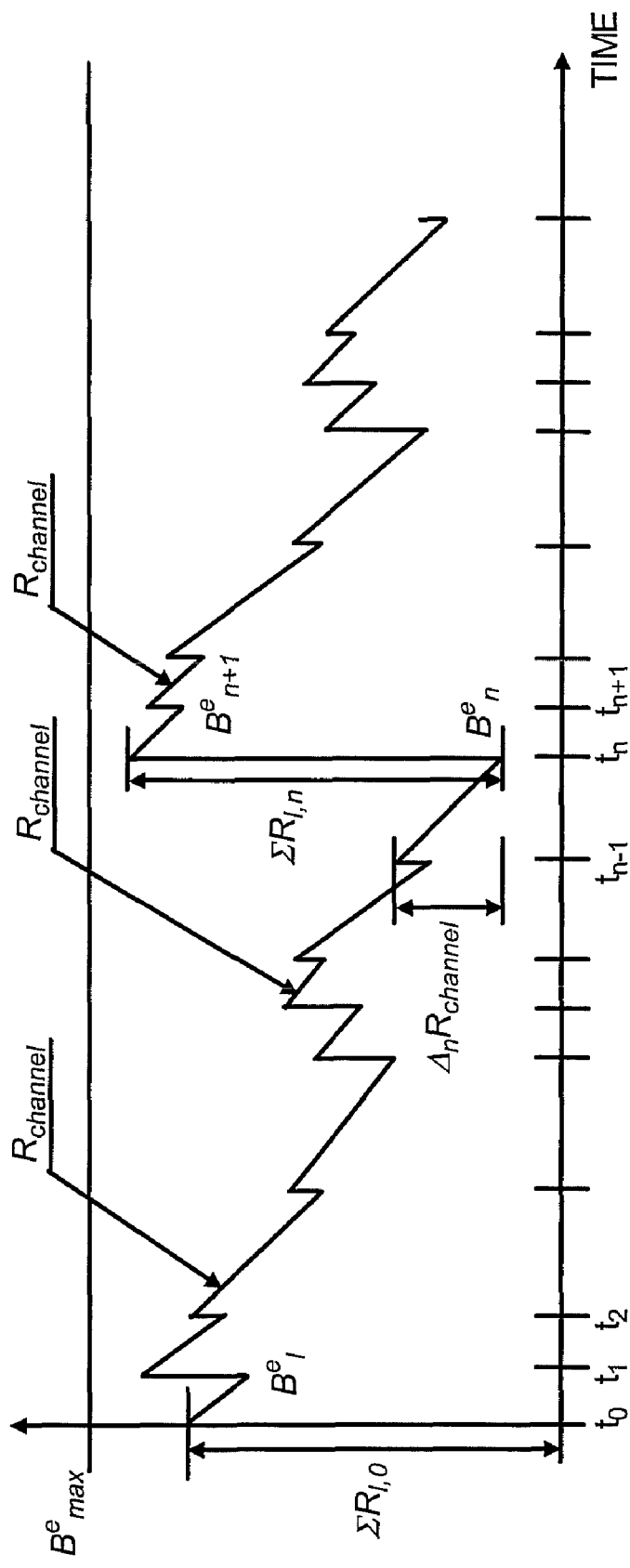
FIG. 3 illustrates a diagram of a model of a combined encoder buffer, according to an embodiment.

FIG. 3 illustrates a model of the combined encoder buffer 104. A size of the combined encoder buffer is given by $B_{max}^e$. At each picture instant $t_n$, there are $$\sum_{l=1}^{L} R_{l,n}$$

compressed bits from the plurality of programs 105a-l moving into the encoder buffer. $R_{l,n}$ is the number of the compressed bits from program l at picture instant $t_n$. If $t_n$ is a picture instant for program l, encoding of a current picture has been completed at $t_n$, and the compressed bits for the picture, $R_{l,n}$, are be moved into the encoder buffer at $t_n$ simultaneously. If $t_n$ is not a picture instant for program l, encoding of the current picture has not yet been completed. Therefore, the MPEG-4 AVC encoder for program l does not send bits into the combined encoder buffer 104 at $t_n$, and $R_{l,n}$ should be equal to zero. An output of the combined encoder buffer 104 is at a CBR of $R_{channel}$ in bits per second. Hence, the slopes between any two consecutive shifts are the same.

$B_n^e$ is a fullness of the combined encoder buffer 104 at picture instant $t_n$. The fullness of the combined encoder buffer 104 immediately following picture instant $t_n$ is equal to $$B_n^e + \sum_{l=1}^{L} R_{l,n},$$

which is a local maximum and has to be equal to, or smaller than, the size of the combined encoder buffer 104, i.e., $$B_n^e + \sum_{l=1}^{L} R_{l,n} \le B_{max}^e. \qquad \text{Equation (6)}$$

Up to a next instant of $t_{n+1}$, there are no bits moving into the buffer. Instead, within an interval of $\Delta_{n+1} = t_{n+1} - t_n$, $\Delta_{n+1} R_{channel}$ bits are moving out the combined encoder buffer 104, as shown in FIG. 3. Therefore, immediately preceding picture instant $t_{n+1}$, the fullness of the combined encoder buffer 104 is $$B_n^e + \sum_{l=1}^{L} R_{l,n} - \Delta_{n+1} R_{channel},$$

which represents a local minimum and has to be equal to, or greater than, zero, i.e., $$0 \le B_n^e + \sum_{l=1}^{L} R_{l,n} - \Delta_{n+1} R_{channel}. \qquad \text{Equation (7)}$$

From Equation (6) and Equation (7), a range of values is determined as $$\Delta_{n+1} R_{channel} - B_n^e \le \sum_{l=1}^{L} R_{l,n} \le B_{max}^e - B_n^e, \qquad \text{Equation (8)}$$

which is a constraint on the total number of bits allowed from the plurality of programs 105a-l at instant $t_n$ for a given channel rate, $R_{channel}$. With an accurate rate control in each AVC encoder, the total number of bits generated for a picture can be close to a target number of bits. That is, at instant $t_n$, $$R_{l,n} \Rightarrow T_{l,n}. \qquad \text{Equation (9)}$$

Further, the total number of bits generated for the plurality of programs 105a-l at instant $t_n$ is close to the sum of the target numbers of bits for the current pictures of the plurality of programs 105a-l, i.e., $$\sum_{l=1}^{L} R_{l,n} \Rightarrow \sum_{l=1}^{L} T_{l,n}. \qquad \text{Equation (10)}$$

Note that if picture instant $t_n$ is not a picture instant of program l, both $R_{l,n}$ and $T_{l,n}$ are set to zero in the above equation. The constraint on the total number of bits for the plurality of programs 105a-l at instant $t_n$ may therefore be translated into the constraint on the target rate, i.e., $$\Delta_{n+1} R_{channel} - B_n^e \le \sum_{l=1}^{L} T_{l,n} \le B_{max}^e - B_n^e. \qquad \text{Equation (11)}$$

The stat mux rate controller 101 determines $T_{l,n}$ to prevent the overflow of the upper boundary of the combined encoder buffer and the underflow of a lower boundary of the combined encoder buffer. A range of values for $T_{l,n}$ may be determined using an equation $$T_{l,n} = \begin{cases} T_{l,n} \times (\Delta_{n+1} R_{channel} - B_n^e) / \sum_{l=1}^{L} T_{l,n} & \text{if} \\ T_{l,n} \times (B_{max}^e - B_n^e) / \sum_{l=1}^{L} T_{l,n} & \text{if} \\ T_{l,n} & \text{otherwise} \end{cases} \qquad \text{Equation (12)}$$

$$\sum_{l=1}^{L} T_{l,n} < \Delta_{n+1} R_{channel} - B_n^e$$

$$\sum_{l=1}^{L} T_{l,n} > B_{max}^e - B_n^e$$

in which $B_{max}^e$ is a capacity of the combined encoder buffer 104, $B_n^e$ it is a fullness of the combined encoder buffer 104 at picture instant $t_n$, and $R_{channel}$ is a CBR output of the combined encoder buffer 104.

Before distributing $T_{l,n}=T_{l,Ff,picType}$, determined by Equation (3) to a current picture of program l, the stat mux rate controller 101 determines if $T_{l,n}$ is in the range using Equation (11), and if not, $T_{l,n}$ is adjusted using Equation (12).

The stat mux rate controller 101 determines $T_{l,n}$ only for the programs with $t_n$ as their picture instant. If $t_n$ is not a picture instant for a program l, the current picture of program l has not been done yet. Hence, $T_{l,n}=T_{l,Ff,picType}$ determined by Equation (3) will not be used for any picture of program l and $T_{l,n}=T_{l,Ff,picType}$ will be updated at a next picture instant.

3. Decoder and Decoder Buffer Protection

Figure 4:
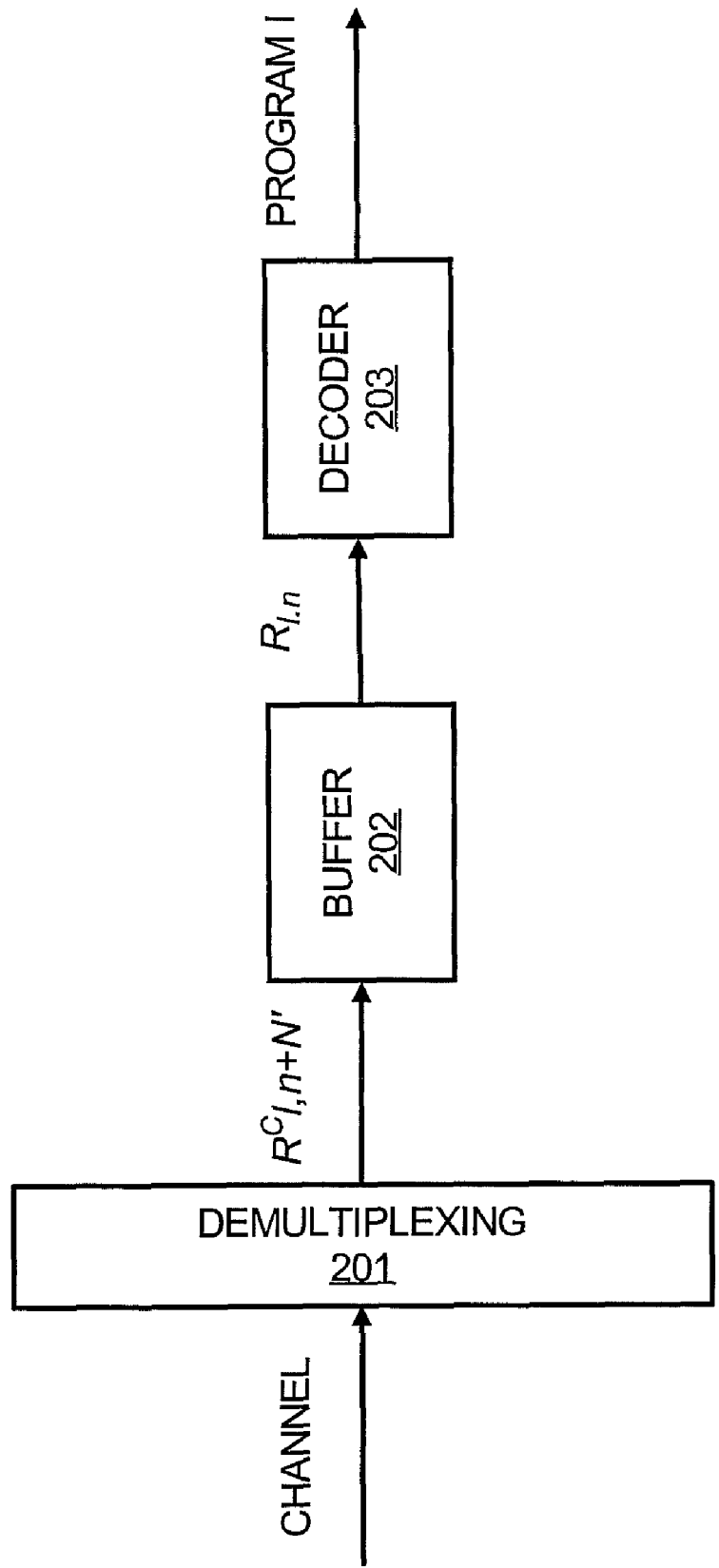
FIG. 4 illustrates a simplified block diagram of an end device, according to an embodiment.

According to an embodiment, the stat mux system 100, shown in FIG. 1, outputs the single CBR bit stream over the channel to end devices, for instance an end device 200 as described with respect to FIG. 4. Prior to outputting the single CBR bit stream to the end device 200, the stat mux rate controller 101 may determine $T_{l,n}$ for the end device 200 to prevent an overflow or an underflow of the decoder buffer 202.

FIG. 4 illustrates a simplified block diagram of the end device 200 configured to de-multiplex the single CBR bit stream to form a VBR bit stream of a particular program of the plurality of programs 105a-l. The end device 200 may comprise a cable modem or other device configured to decode the VBR bit stream. As shown in FIG. 4, the end device 200 includes a de-multiplexing unit 201, a decoder buffer 202, and a decoder 203. It should be understood that the end device 200 depicted in FIG. 4 may include additional components and that some of the components described herein may be removed and/or modified without departing from a scope of the end device 200.

The end device 200 receives the single CBR bit stream from the channel at the de-multiplexing unit 201. A user of the end device 200 may select a particular program from the plurality of programs 105a-l using the end device 200. The de-multiplexing unit 201 de-multiplexes the single CBR bit stream and extracts a de-multiplexed bit stream including packets corresponding to the particular program. The de-multiplexed bit stream is a VBR bit stream. The de-multiplexed bit stream is input to the decoder buffer 202 prior to being decoded by the decoder 203.

Figure 5:
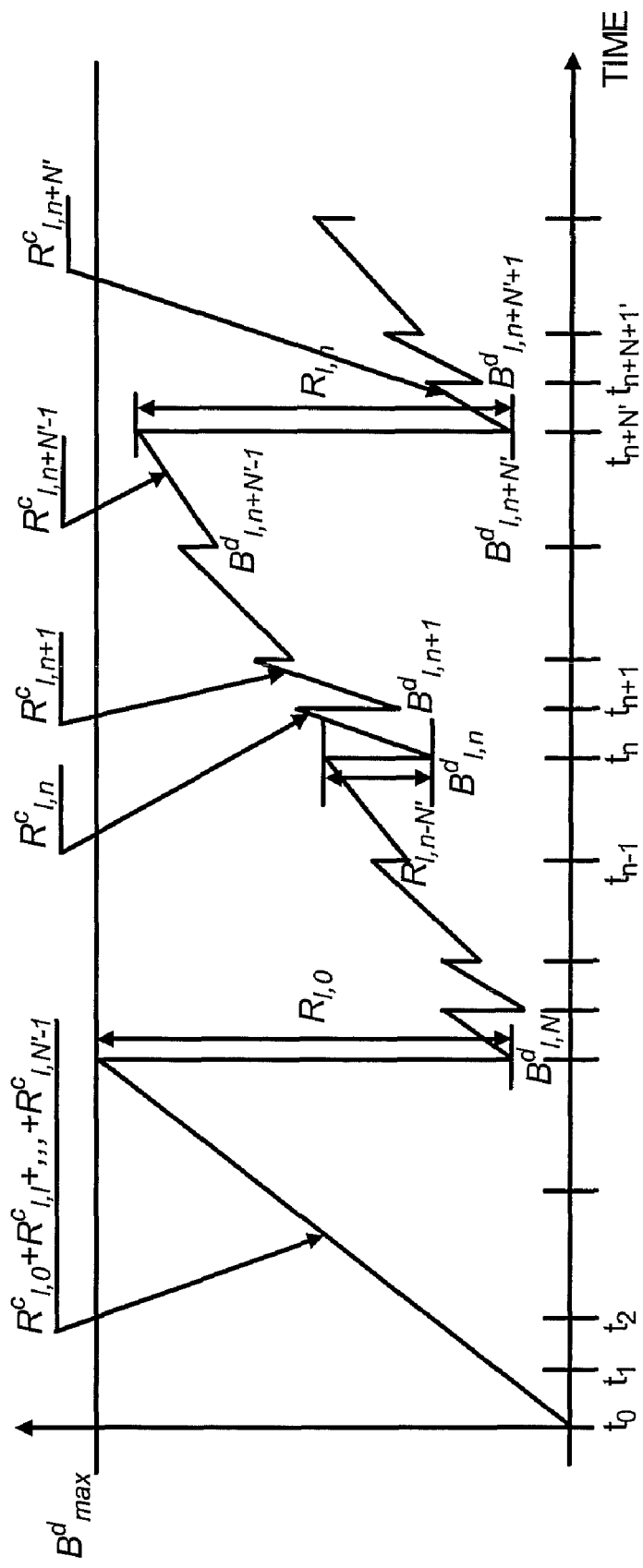
FIG. 5 illustrates a model of a decoder buffer, according to an embodiment.

FIG. 5 shows a model of the decoder buffer 202. The end device 200 selects program l from among the plurality of programs 105a-l. The decoder buffer 202 has a decoding delay of N' pictures or $t_{N'}$ seconds. $R_{l,n}^c$ is a number of bits transmitted for program l between instants $t_n$ and $t_{n+1}$. The decoder buffer 202 will be filled up to $$\sum_{n=0}^{N'-1} R_{l,n}^c$$

before any bits are moved out. At each picture instant $t_{n+N'}$, compressed bits for picture n, $R_{l,n}$, are moved out the decoder buffer 202 and moved into the decoder 203 instantaneously, and between the picture instants of $t_{n+N'}$ and $t_{n+N'+1}$, the decoder buffer receives $R_{l,n+N'}^c$ bits from the channel as shown in FIG. 5.

$B_{l,n+N'}^d$ is a fullness of the decoder buffer 202 at the picture instant of $t_{n+N'}$, immediately after the compressed bits for picture n are moved out as shown in FIG. 5. $B_{l,n+N'}^d$ is a local minimum and has to be equal to, or greater than, zero, i.e., $$0 \leq B_{l,n+N'}^d.$$ Equation (13)

Furthermore, the fullness of the decoder buffer 202 immediately preceding the picture instant of $t_{n+N'+1}$ is $B_{l,n+N'}^d +$ $R_{l,n+N'}^c$, as shown in FIG. 5. This is a local maximum and has to be equal to, or smaller than, a maximum size of the decoder buffer 202, say $B_{max}^d$, that is $$B_{l,n+N'}^d + R_{l,n+N'}^c \leq B_{max}^d.$$ Equation (14)

Using Equation (14) and Equation (15), a further determination may be made using a combined equation, $$0 \leq B_{l,n+N'}^d \leq -R_{l,n+N'}^c + B_{max}^d.$$ Equation (15)

A buffer fullness at the picture instant of $t_{n+N'}$, $B_{l,n+N'}^d$, may be determined using an equation, $$B_{l,n+N'}^d = B_{l,n+N'-1}^d + R_{l,n+N'-1}^c - R_{l,n}$$ Equation (16)

in which n=1, 2, . . . .

$B_{l,n+N'}^d$ may be represented by equivalent equations $$B_{l,N'}^d + \sum_{n'=0}^{n-1} R_{l,n'+N'}^c - \sum_{n'=1}^{n} R_{l,n'}$$ Equation (17)

$$\left( \sum_{n'=0}^{N'-1} R_{l,n'}^c - R_{l,0} \right) + \sum_{n'=N'}^{n+N'-1} R_{l,n'}^c - \sum_{n'=1}^{n} R_{l,n'}$$ Equation (18)

$$\sum_{n'=n}^{n+N'-1} R_{l,n'}^c + \left( \sum_{n'=0}^{n-1} R_{l,n'}^c - \sum_{n'=0}^{n-1} R_{l,n'} \right) - R_{l,n}$$ Equation (19)

$$\sum_{n'=n}^{n+N'-1} R_{l,n'}^c - B_{l,n}^e - R_{l,n}$$ Equation (20)

$$B_{l,n}^e = \sum_{n'=0}^{n-1} R_{l,n'} - \sum_{n'=0}^{n-1} R_{l,n'}^c,$$ Equation (21)

may be considered as a fullness of a virtual encoder buffer at the picture instant of $t_n$ for program l.

Using Equation (15) and any of Equation (16) through Equation (20), a further equation may be deduced, $$0 \leq \sum_{n'=n}^{n+N'-1} R_{l,n'}^c - B_{l,n}^e - R_{l,n} \leq -R_{l,n+N'}^c + B_{max}^d, \text{ or }$$ Equation (22)

$$\sum_{n'=n}^{n+N'} R_{l,n'}^c - B_{l,n}^e - B_{max}^d \leq R_{l,n} \leq \sum_{n'=n}^{n+N'-1} R_{l,n'}^c - B_{l,n}^e.$$ Equation (23)

This is a constraint on the number of bits for picture n of program l. If the target rate for a picture can be met, a constraint on rate for a picture may be translated into a constraint on target rate for the picture, i.e., $$\sum_{n'=n}^{n+N'} R_{l,n'}^c - B_{l,n}^e - B_{max}^d \leq T_{l,n} \leq \sum_{n'=n}^{n+N'-1} R_{l,n'}^c - B_{l,n}^e.$$ Equation (24)

Therefore, before the stat mux system 100 starts to encode picture n of program l using a target rate $T_{l,n}=T_{l,Ff,picType}$ determined by Equation (3), the stat mux rate controller 101 determines if the target rate is within a proper range, and if not, the stat mux rate controller 101 may adjust $T_{l,n}$ using an equation $$T_{l,n} = \begin{cases} \sum_{n'=n}^{n+N'} R^c_{l,n'} - B^e_{l,n} - B^d_{max} & \text{if } T_{l,n} < \sum_{n'=n}^{n+N'} R^c_{l,n'} - B^e_{l,n} - B^d_{max} \\ \sum_{n'=n}^{n+N'-1} R^c_{l,n'} - B^e_{l,n} & \text{if } T_{l,n} > \sum_{n'=n}^{n+N'-1} R^c_{l,n'} - B^e_{l,n} \\ T_{l,n} & \text{otherwise,} \end{cases}$$

Equation (25)

in which $B_{l,n}^e$ is the fullness of a virtual encoder buffer for program l at the picture instant of $t_n$, defined in Equation (21), and is available. Further, transmission rates for program l during the intervals of future pictures, $R_{l,n'}^c$, n'=n, n+1, ..., n+N', may be pre-determined. According to an embodiment, the stat mux system 100 determines an average input rate to each individual decoder buffer as equal to an average output rate. Further, the stat mux system 100 determines a total transmission rate of the plurality of programs 105a-l as equal to the channel rate.

The stat mux system 100 may determine a piece-wide constant rate within an interval of $\Delta_{n+1}=t_{n+1}-t_n$ to equal to the average compression rate for the pictures that are most recently moved out the decoder buffer 202, that is, $$R^t_{l,n} = \frac{1}{W} \sum_{n''=n-N'-N_n+1}^{n-N'} R_{l,n''}, \text{ in which}$$

Equation (26)

$$N_n = \frac{W}{\Delta_{n+1}}.$$

Equation (27)

For progressive sequences, $\Delta_{n+1}=t_{n+1}-t_n$ is an interval between two consecutive pictures n+1 and n. For interlace sequences, $\Delta_{n+1}=t_{n+1}-t_n$ is an interval between two consecutive frame or field pictures n+1 and n. If frame interval is in use, and if frame n=2m is coded as two field pictures 2m and 2m+1, the compressed bits for the two field pictures of the same frame may be combined into one using an equation $$R_{l,2m} = \begin{cases} R_{l,2m} & \text{if coded as one frame} \\ R_{l,2m} + R_{l,2m+1} & \text{if coded as two fields.} \end{cases}$$

Equation (28)

If field interval is in use, and if frame n=2m is coded as a single frame picture, its compressed bits need to be divided into two, one assigned for field picture instant $t_{2m}$ and the other for field picture instant $t_{2m+1}$, that is, $$R_{l,2m} = \begin{cases} R_{l,2m}/2 & \text{if coded as one frame} \\ R_{l,2m} & \text{if coded as two fields.} \end{cases}$$

Equation (29)

$$R_{l,2m+1} = \begin{cases} R_{l,2m}/2 & \text{if coded as one frame} \\ R_{l,2m+1} & \text{if coded as two fields.} \end{cases}$$

Equation (30)

The number of the transmitted bits for program l within this interval $\Delta_{n+1}=t_{n+1}-t_n$ is therefore equal to, $$R^c_{l,n} = \Delta_{n+1} R^t_{l,n} = \frac{1}{N_n} \sum_{n''=n-N'-N_n+1}^{n-N'} R_{l,n''}.$$

Equation (31)

Using Equation (29) or Equation (30), the stat mux system 100 determines a total number of bits input to the decoder buffer 202 is equal to the output bits, that is, $$\sum_{n=-\infty}^{\infty} R^c_{l,n} = \sum_{n=-\infty}^{\infty} \frac{1}{N_n} \sum_{n''=n-N'-N_n+1}^{n-N'} R_{l,n''} =$$

$$\sum_{n=-\infty}^{\infty} \frac{1}{N_n} (R_{l,n-N'-N_n+1} + R_{l,n-N'-N_n+2} +,$$

$$\ldots, + R_{l,n-N'}) = \sum_{n=-\infty}^{\infty} R_{l,n}$$

Equation (32)

Using Equation (26), the stat mux system 100 determines a total transmission rate for the plurality of programs 105a-l as equal to the channel rate, that is, $$\sum_{l=1}^{L} R^t_{l,n} = \sum_{l=1}^{L} \frac{1}{W} \sum_{n''=n-N'-N_n+1}^{n-N'} R_{l,n''} =$$

$$\frac{1}{W} \sum_{l=1}^{L} \sum_{n''=n-N'-N_n+1}^{n-N'} R_{l,n''} = \frac{1}{W}(W \times R_{channel}) = R_{channel}$$

Equation (33)

With the future transmission rates determined using Equation (26) and Equation (31), all the terms in the upper boundary for picture n of program l, $\Sigma_{n'=n}^{n+N'-1} R_{l,n'}^c - B_{l,n}^e$ in Equation (23) and Equation (24) are available for picture n, or the upper boundary may be calculated based upon the information of previous pictures, for instance pictures n−1, n−2, etc.

However, in the lower boundary of $\Sigma_{n'=n}^{n+N'} R_{l,n'}^c - B_{l,n'}^e - B_{max}^d$ in Equation Equation (23) and Equation (24), the term $$R^c_{l,n+N'} = \frac{1}{N_{n+N'}}(R_{l,n-N_n+1} +, \ldots, + R_{l,n-1} + R_{l,n})$$

requires information on a number of bits for picture n, $R_{l,n}$, which is not available at the picture instant of $t_n$. By substituting Equation (31) into the lower boundary in Equation (23), we have $$\sum_{n'=n}^{n+N'-1} R^c_{l,n'} + \frac{1}{N_n}\left(\sum_{n''=n-N_n+1}^{n-1} R_{l,n''} + R_{l,n}\right) - B^e_{l,n} - B^d_{max} \leq$$

Equation (34)

$R_{l,n}$, or

-continued $$\sum_{n'=n}^{n+N'-1} R_{l,n'}^c + \frac{1}{N_n} \sum_{n''=n-N_n+1}^{n-1} R_{l,n''} - B_{l,n}^c - B_{max}^d \leq \quad \text{Equation (35)}$$

$$\left(1 - \frac{1}{N_n}\right) R_{l,n}.$$

The lower boundary for picture n of program l may therefore be determined as $$\frac{N_n}{N_n - 1} \left( \sum_{n'=n}^{n+N'-1} R_{l,n'}^c + \frac{1}{N_n} \sum_{n''=n-N_n+1}^{n-1} R_{l,n''} - B_{l,n}^c - B_{max}^d \right) \leq \quad \text{Equation (35b)}$$

$$R_{l,n} = T_{l,n}.$$

in which all the associated terms in the lower boundary are measurable at the picture instant of $t_n$.

4. Constraint on Maximum and Minimum Bit Rate

The stat mux system 100 may be configured to control the average bit rate over a predetermined number of pictures by limiting the target number of bits for each picture within a specific range. $R_{max}$ and $R_{min}$ are an allowed maximum and an allowed minimum average bit rate over N" pictures. The average bit rate of N" picture up to picture n therefore has to be in the range of $[R_{min}, R_{max}]$, i.e., $$R_{min} \leq \frac{1}{N''} \sum_{n'=n-N''+1}^{n} R_{l,n'} \leq R_{max}, \text{ or} \quad \text{Equation (36)}$$

$$N'' R_{min} - \sum_{n'=n-N''+1}^{n-1} R_{l,n'} \leq R_{l,n} \leq N'' R_{max} - \sum_{n'=n-N''+1}^{n-1} R_{l,n'}. \quad \text{Equation (37)}$$

This is an additional constraint on the number of bits for picture n of program l.

$R_{l,n',l}$, n'=n−N", n−N", ..., n−1, are all available at picture n. Using the stat mux rate controller 101, the actual bit rate may be made to approximate the target rate, i.e., $$T_{l,n} = R_{l,n}. \quad \text{Equation (38)}$$

The additional constraint on the actual bit rate for picture n becomes the constraint on its target rate, i.e., $$N'' R_{min} - \sum_{n'=n-N''+1}^{n-1} R_{l,n'} \leq T_{l,n} \leq N'' R_{max} - \sum_{n'=n-N''+1}^{n-1} R_{l,n'}. \quad \text{Equation (39)}$$

If necessary, the stat mux rate controller 101 may adjust the target rate for each picture, $T_{l,n} = T_{l,Ff,picType}$ determined by Equation (3), as follows $$T_{l,n} = \begin{cases} N'' R_{min} - \sum_{n'=n-N''+1}^{n-1} R_{l,n'} & \text{if } T_{l,n} < N'' R_{min} - \sum_{n'=n-N''+1}^{n-1} R_{l,n'} \\ N'' R_{max} - \sum_{n'=n-N''+1}^{n-1} R_{l,n'} & \text{if } T_{l,n} > N'' R_{max} - \sum_{n'=n-N''+1}^{n-1} R_{l,n'} \\ T_{l,n} & \text{otherwise.} \end{cases} \quad \text{Equation (40)}$$

5. Statistical Multiplexing Methods for Encoders

Figure 6:
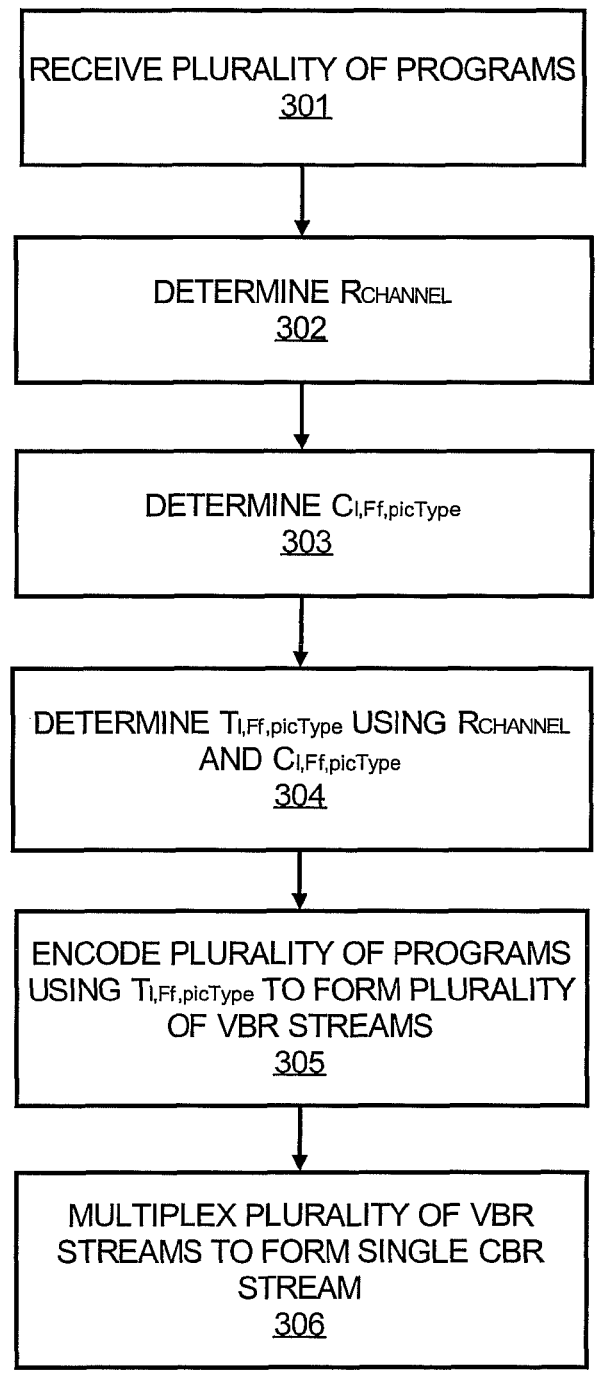
FIG. 6 illustrates a flow diagram of a method of statistically multiplexing a plurality of programs, according to an embodiment.
Figure 7:
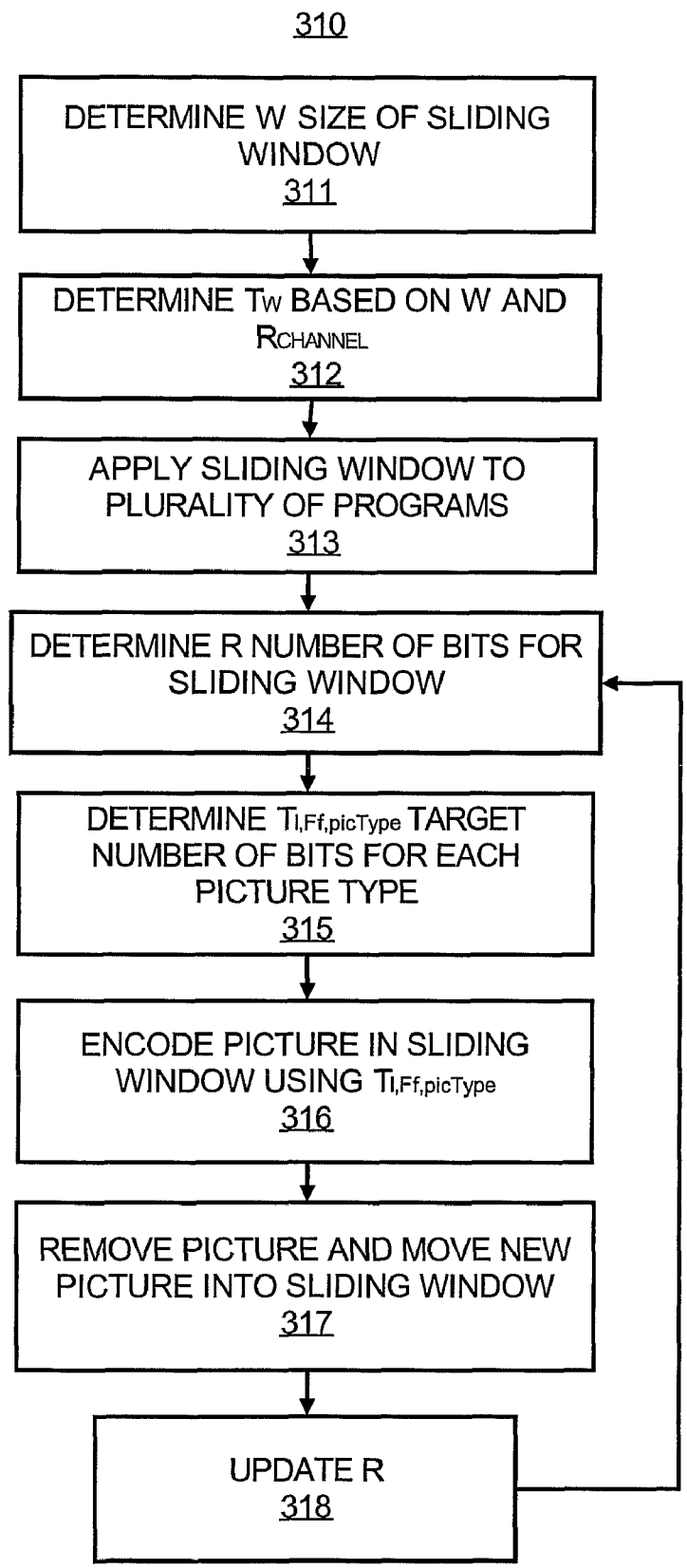
FIG. 7 illustrates a flow diagram of a method of encoding a plurality of programs using a sliding window, according to an embodiment.
Figure 8:
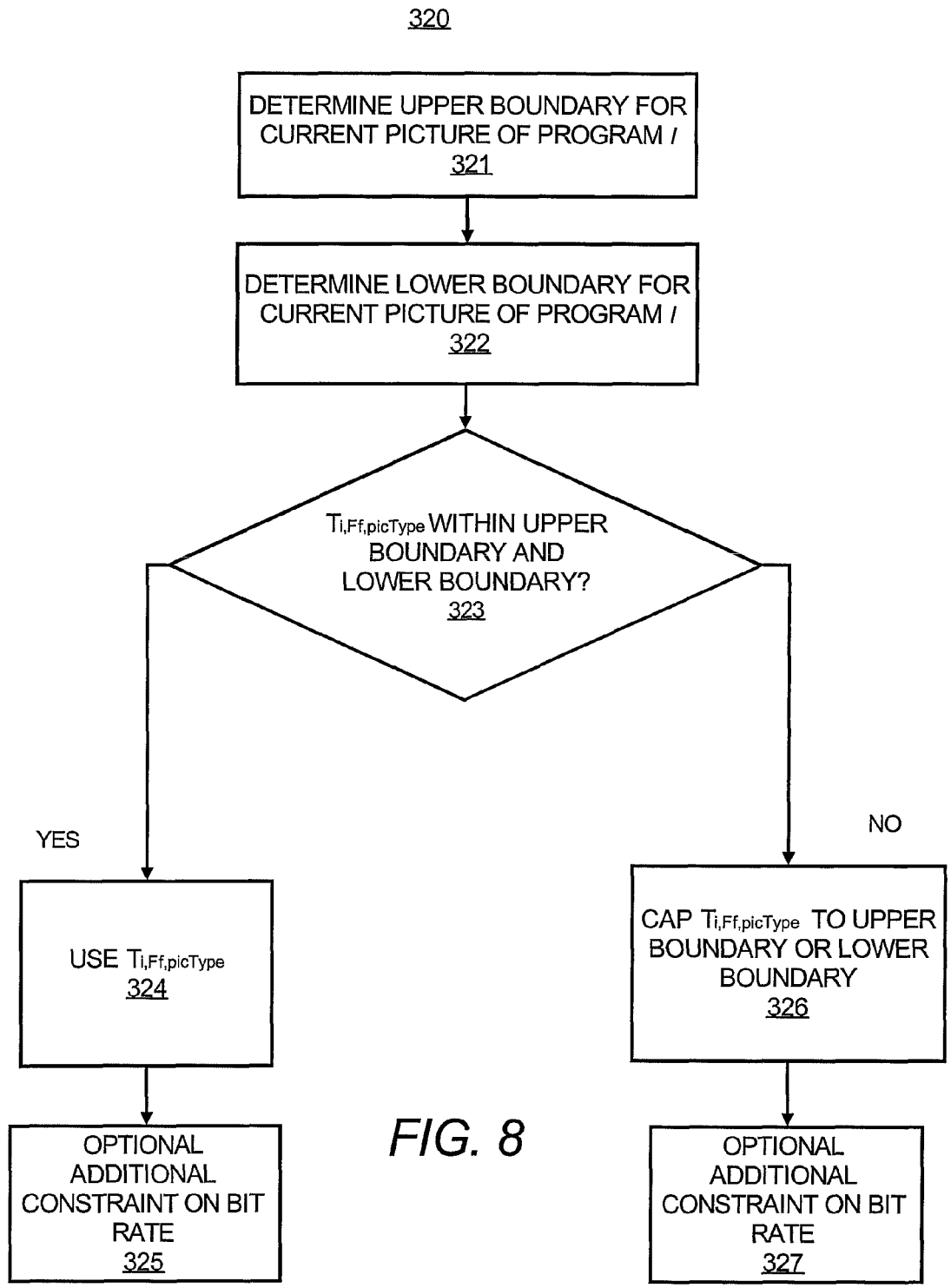
FIG. 8 illustrates a flow diagram of a method of preventing an overflow and underflow of a combined encoder buffer, according to an embodiment.

Examples of methods in which the stat mux system 100 may be employed to statistically multiplex a plurality of programs 105*a-l* are now described with respect to the following flow diagrams of the methods 300-330 depicted in FIGS. 6-8. It should be apparent to those of ordinary skill in the art that the methods 300-330 represent generalized illustrations and that other steps may be added or existing steps may be removed, modified or rearranged without departing from the scopes of the methods 300-330. In addition, the methods 300-330 are described with respect to the stat mux system 100 by way of example and not limitation, and the methods 300-330 may be used in other systems.

Some or all of the operations set forth in the methods 300-330 may be contained as one or more computer programs stored in any desired computer readable medium and executed by a processor on a computer system. Exemplary non-transitory computer readable media that may be used to store software operable to implement the present invention include but are not limited to conventional computer system RAM, ROM, EPROM, EEPROM, hard disks, or other data storage devices.

The method 300, as shown in FIG. 6, is a generalized illustration of a method for statistically multiplexing a plurality of programs 105*a-l* using a plurality of MPEG-4 AVC encoders 102*a-l*. Although illustrated with respect to AVC encoders, the method 300 may be applied to any single-pass encoders.

At step 301, as shown in FIG. 6, the stat mux system 100 receives the plurality of programs 105*a-l* at the plurality of MPEG-4 AVC encoders 102*a-l*. Each of the plurality of programs 105*a-l* may be an input video sequence. The stat mux system 100 may be located, for instance, in a head end of a cable communications system or other communications system.

At step 302, the stat mux system 100 determines $R_{channel}$ using the stat mux rate controller 101. $R_{channel}$ is a constant total bit rate for the plurality of programs 105*a-l*. The stat mux rate controller 101 may determine $R_{channel}$ by determining a capacity of a communications channel through which the stat mux system 100 communicates with end devices.

At step 303, the stat mux rate controller 101 determines $C_{l,Ff,picType}$. $C_{l,Ff,picType}$ is a complexity for each picture in the plurality of programs 105*a-l*. The stat mux rate controller 101 may determine $C_{l,Ff,picType}$ by applying an equation, for instance, Equation (4) or alternately Equation (5) hereinabove.

The stat mux system 100 distributes the available bits over the plurality of programs 105*a-l* according to their relative complexity measures. More complex programs are assigned more bits and less complex programs are assigned less bits. The rate assigned for each program therefore depends on not only each program's own complexity measure, but also the complexity measures of the other programs in the plurality of programs 105*a-l*. Because program complexity may vary over time, the relative complexity for each program may vary as well. According to an embodiment, the stat mux system 100 uses the sliding window method as described with respect to FIG. 7 and the method 310 hereinbelow to smooth out the variation of the bit allocation. The sliding window is determined to cover many pictures from each program l. The bit allocation over programs is a time-varying function as $C_{l,Ff,picType}$ is updated after each picture instant.

At step 304, the stat mux rate controller 101 determines $T_{l,Ff,picType}$ based on $C_{l,Ff,picType}$ and $R_{channel}$. $T_{l,Ff,picType}$ is a bit allocation for each picture in the plurality of programs 105*a-l*. The stat mux rate controller 101 may maintain eight sets of picture complexity measures, for instance $C_{l,Ff,picType}$, and target number of bits, for instance $T_{l,Ff,picType}$, for each of the plurality of programs 105a-l, each corresponding to one particular picture of picType∈{I, P, B$_s$, B} in Ff∈{frame, field}. Due to differences dependent on frame/field and spatial/temporal processing, different pictures may require very different numbers of bits in order to maintain a similar quality. The bit allocation for each picture type may be used only for the particular picture of a smallest picture order count (POC) using a sliding window, as described hereinbelow with respect to FIG. 7 and the method 310. In either instance, $T_{l,Ff,picType}$ will be updated for each subsequent picture. Alternately, the bit allocation may be used for all of the same in the same picType∈{I, P, B$_s$, B} in the same Ff∈{frame, field} of program l.

At step 305, the stat mux system 100 encodes the plurality of programs using the plurality of MPEG-4 AVC encoders 102a-l, the combined encoder buffer 104 having an upper boundary and a lower boundary and $T_{l,Ff,picType}$ to form a plurality of VBR compressed bit streams.

At step 306, the stat mux system 100 multiplexes the plurality of VBR compressed bit streams using the multiplexing unit 103 to form the single CBR bit stream. The stat mux system 100 thereafter outputs the single CBR bit stream using the channel and the combined encoder buffer 104.

The method 310, as shown in FIG. 7, is a generalized illustration of a method of encoding the plurality of programs 105a-l in the plurality of MPEG-4 AVC encoders 102a-l using a sliding window approach. The method 310 may be applied in the method 300. The method 310 is also described with respect to the model of the sliding window shown in FIG. 2.

At step 311, as shown in FIG. 7, the stat mux rate controller 101 determines W for a sliding window. W is a size of the sliding window in seconds. If frame rates for the plurality of programs 105a-l are available, W may be set as a least common multiple of the L frame rates, that is, $$W = LCM(\text{FrameRate}_l, l=1, 2, \ldots L). \quad \text{Equation (41)}$$

At step 312, the stat mux rate controller 101 determines $T_W$, a nominal number of bits for the sliding window, based on W and $R_{channel}$. Given a channel rate in bits per second, $R_{channel}$, and the slide window size of W seconds, the nominal number of bits for the slide window of the plurality of programs 105a-l, $T_W$, may be determined by an equation $$T_W = W \times R_{channel} \quad \text{Equation (1)}$$

At step 313, the plurality of MPEG-4 AVC encoders 102a-l apply the sliding window to the plurality of programs 105a-l at $t_n$. $t_n$ is a current picture instant at which the plurality of MPEG-4 AVC encoders 102a-l are encoding the plurality of programs 105a-l, for instance as shown in FIG. 2.

At step 314, the stat mux rate controller 101 determines R. R is a number of bits for the sliding window. R is initially determined using an equation $$R = T_W, \quad \text{Equation (42)}$$

for $t_n < W$. R is determined as $T_W$ for $t_n < W$ because the actual number of bits used in encoding the sliding window is not known at $t_n < W$.

At step 315, the stat mux rate controller 101 determines $T_{l,Ff,picType}$, a target number of bits for each picture type of program l in the sliding window. For instance, the stat mux rate controller 101 may determine $T_{l,Ff,picType}$ using the equation $$T_{l,Ff,picType} = \frac{\alpha_{l,Ff}\beta_{l,Ff}\gamma_{l,Ff,picType}C_{l,Ff,picType}}{\sum_{l=1}^{L}\sum_{Ff}\sum_{picType\in} n_{l,Ff,picType}} R \quad \text{Equation (3)}$$

$$\alpha_{l,Ff}\beta_{l,Ff}\gamma_{l,Ff,picType}C_{l,Ff,picType}$$

The pictures covered by the sliding window may be frame and field pictures, and each frame or field picture may be I, P, Bs, or B. The stat mux rate controller 101 uses picture structures (frame or field) and types (I, P, Bs or B) to determine a more effective distribution of the bit budget. The stat mux rate controller 101 determines a number of I, P, Bs and B frame pictures, and a number of I, P, Bs and B field pictures in the sliding window.

At step 316, the plurality of MPEG-4 AVC encoders 102a-l encodes a picture from the plurality of programs 105a-l using $T_{l,Ff,picType}$. $T_{l,Ff,picType}$ only used for the picture of a smallest POC within the slide window. $T_{l,Ff,picType}$ will be updated/recalculated for next picture.

At step 317, after a picture is encoded from the plurality of programs 105a-l, the picture is removed from the sliding window and a new picture is moved into the sliding window. The sliding window is shifted along the time domain at every (frame or field) picture instant of the plurality of programs 105a-l. Because the plurality of programs 105a-l may have different frame rates and a frame may be coded as a single frame picture or two field pictures, the shifted period varies from time to time. Let $\Delta_n = t_n - t_{n-1}$ be the interval in seconds between two shift instants $t_n$ and $t_{n-1}$. $\Delta_n$ may not be necessarily equal to $\Delta_m$, if n≠m. For every shift, encoded (frame and field) pictures of I, P, Bs or B are moved out the slide window, and new (frame and field) pictures of I, P, Bs or B are moved in. Given a shift instant $t_{n-1}$, encoding of the L current pictures from the plurality of programs 105a-l should be completed at instant $t_n$, $t_{n+1}$, or $t_{n+L-1}$. If none of the L current pictures from the plurality of programs 105a-l are synchronized, a numbers of pictures moving into and a numbers of pictures moving out of the sliding window may not be the same, with a difference of any number between 1 to L.

At step 318, as each picture is removed from the sliding window, the stat mux rate controller 101 updates R to a value determined by Equation (2) hereinabove. The updated value for R may be used in determining an updated value for $T_{l,Ff,picType}$ at step 315 of the method 310 hereinabove.

The method 320, as shown in FIG. 8, is a generalized illustration of a method of preventing an overflow and an underflow of the combined encoder buffer 104.

At step 321, as shown in FIG. 8, the stat mux rate controller 101 of the stat mux system 100 determines the upper boundary for a current picture of a program l to prevent an overflow of the combined encoder buffer 104. For instance, the upper boundary for the current picture may be determined using Equation (11).

At step 322, the stat mux rate controller 101 determines the lower boundary for a current picture of program l to prevent an underflow of the combined encoder buffer 104. For instance, the lower boundary for the current picture of program l may be determined using Equation (11).

At step 323, the stat mux rate controller 101 determines whether $T_{l,n} = T_{l,Ff,picType}$ is within the upper boundary and the lower boundary. This is a boundary for target rate per picture per program.

At step 324, in response to a determination at step 323 that $T_{l,Ff,picType}$ is within the upper boundary and the lower boundary, the stat mux rate controller 101 uses $T_{l,Ff,picType}$ for the current picture of program l.

At step 325, the stat mux rate controller 101 may determine an optional additional constraint on $T_{l,Ff,picType}$ using Equation (40).

At step 326, in response to a determination at step 323 that $T_{l,Ff,picType}$ is not within the upper boundary or the lower boundary, the stat mux rate controller 101 caps $T_{l,Ff,picType}$ to the upper or lower boundary for the current picture of program l. The stat mux rate controller 101 may cap $T_{l,n} = T_{l,Ff,picType}$ using Equation (12).

At step 327, the stat mux rate controller 101 may determine an optional additional constraint, similar to step 325.

Figure 9:
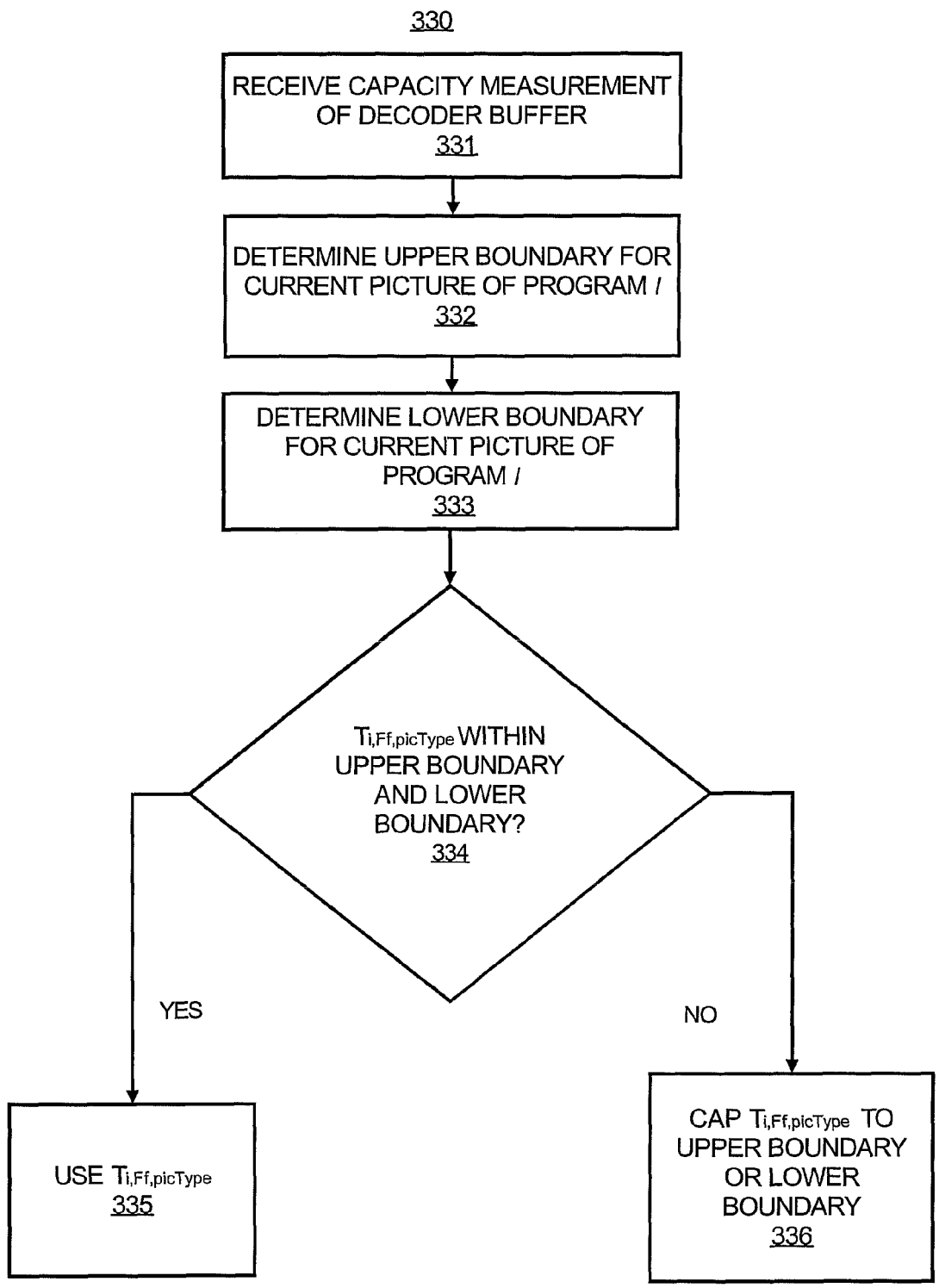
FIG. 9 illustrates a flow diagram of a method of preventing an overflow and underflow of a decoder buffer, according to an embodiment.

The method 330, as shown in FIG. 9, is a generalized illustration of a method of preventing an overflow and an underflow of the decoder buffer 202.

At step 331, as shown in FIG. 9, the stat mux rate controller 101 of the stat mux system 100 receives a capacity measurement for the decoder buffer 202 for the end device 200.

At step 332, the stat mux rate controller 101 determines the upper boundary for a current picture of a program l to prevent an overflow of the decoder buffer 202. For instance, the upper boundary for the current picture may be determined using Equation (24). The upper boundary is not constant, and may vary from time to time.

At step 333, the stat mux rate controller 101 determines the lower boundary for a current picture of a program l to prevent an underflow of the decoder buffer 202. For instance, the lower boundary for the current picture may be determined using Equation (24). The lower boundary is not constant, and may vary from time to time.

At step 334, the stat mux rate controller 101 determines whether $T_{l,n} = T_{l,Ff,picType}$ is within the upper boundary and the lower boundary.

At step 335, in response to a determination at step 334 that $T_{l,Ff,picType}$ is within the upper boundary and the lower boundary, the stat mux rate controller 101 uses $T_{l,Ff,picType}$ for the current picture of program l.

At step 336, in response to a determination at step 334 that $T_{l,Ff,picType}$ is not within the upper boundary or the lower boundary, the stat mux rate controller 101 caps $T_{l,Ff,picType}$ to the upper boundary or the lower boundary. $T_{l,Ff,picType}$ may therefore be adjusted to prevent both the overflow and the underflow using Equation (25).

A computing apparatus (not shown) may be configured to implement or execute one or more of the processes required to statistically multiplex the plurality of programs 105a-l depicted in FIGS. 6-9, according to an embodiment. The computing apparatus may include a processor that may implement or execute some or all of the steps described in the method depicted in FIGS. 6-9. Commands and data from the processor may be communicated over a communication bus. The computing apparatus may also include a main memory, such as a random access memory (RAM), where the program code for the processor, may be executed during runtime, and a secondary memory. The secondary memory includes, for example, one or more hard disk drives and/or a removable storage drive, representing a floppy diskette drive, a magnetic tape drive, a compact disk drive, etc., where a copy of the program code for one or more of the processes depicted in FIGS. 6-9 may be stored. In addition, the processor(s) may communicate over a network, for instance, the Internet, LAN, etc., through a network adaptor.

As described above, the embodiments provide a method and apparatus for statistically multiplexing a plurality of programs. Embodiments of the invention also provide a method of dynamically assigning bandwidth among the plurality of programs. The embodiments of the invention satisfy a channel condition and enhance reconstructed video quality of each of the programs at end devices. The embodiments of the invention also prevent buffer overload at a combined encoder buffer and at decoder buffers for end devices. A particular program is allowed more bandwidth dependent on complexity. Because sequences of high complexity in a plurality of programs tend to occur at different times, the statistical multiplexing system more effectively distributes bandwidth. Embodiments of the invention provide a method of balancing VBR requirements of each program with capacity requirements of the combined encoder buffer and the decoder buffers of end devices.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

What is claimed is:

1. A method for statistically multiplexing a plurality of programs, the method comprising:

determining $R_{channel}$, wherein $R_{channel}$ is a constant total bit rate for the plurality of programs;

determining $C_{l,Ff,picType}$, wherein $C_{l,Ff,picType}$ is a complexity for a picture in the plurality of programs, determining $T_{l,Ff,picType}$, wherein $T_{l,Ff,picType}$ is a bit allocation for the picture in the plurality of programs, based on $C_{l,Ff,picType}$ and $R_{channel}$;

encoding the plurality of programs using a plurality of encoders, a combined encoder buffer, and $T_{l,Ff,picType}$ to form a plurality of variable bit rate (VBR) compressed bit streams; and multiplexing the plurality of VBR compressed bit streams to form a single constant bit rate (CBR) bit stream;

determining W, wherein W is a size of a sliding window in seconds;

determining $T_W$, wherein $T_W$ is a nominal number of bits for the sliding window, based on W and $R_{channel}$;

applying the sliding window to encode the plurality of programs at $t_n$, wherein $t_n$ is a current instant; and sliding the sliding window along a time domain, wherein the sliding includes determining R, wherein R is a number of bits for the sliding window, initially set equal to $T_W$ for $t_n < W$, after a picture is encoded from the plurality of programs, removing the picture from the sliding window and moving a new picture into the sliding window, and updating R to a value determined by an equation $$R = T_W + \left( T_W - \sum_{t_{n'} \in [t_n - W, t_n]} \sum_{l=1}^{L} R_{l,n'} \right),$$

wherein $R_{l,n'}$ is an actual number of bits generated for a picture of program index l at instant $t_{n'}$, and $R_{l,n'}$ is summed over all L programs, wherein L is a total number of the plurality of programs, and over a period from $t_n - W$ to $t_n$.

2. The method of claim 1, wherein $$W = LCM(\text{FrameRate}_l, l=1 \text{to} L)$$

wherein LCM(FrameRate$_l$,l=1toL) is a least common multiple of frame rates for the plurality of programs.

3. The method of claim 1, wherein $$T_W = W \times R_{channel}.$$

4. The method of claim 1, wherein $$T_{l,Ff,picType} = \frac{\alpha_{l,Ff} \beta_{l,Ff} \gamma_{l,Ff,picType} C_{l,Ff,picType}}{\sum_{l=1}^{L} \sum_{Ff} \sum_{picType \in} n_{l,Ff,picType} \alpha_{l,Ff} \beta_{l,Ff} \gamma_{l,Ff,picType} C_{l,Ff,picType}} R$$

wherein Ff∈{frame, field} indicates a frame or field picture, picType∈{I, P, B$_s$, B} indicates a picture type of I, P, Bs or B, $n_{l,Ff,picType}$ indicates a number of pictures of picType∈{I, P, B$_s$, B} in Ff∈{frame, field} for program l in the sliding window, $\alpha_{l,Ff}$ is a constant factor for addressing a spatial resolution of program l, $\beta_{l,Ff}$ is a quality weighting factor for program l, and $\gamma_{l,Ff,picType}$ is a constant factor used to compensate for the picture type picType∈{I, P, B$_s$, B} in Ff∈{frame, field} for program l.

5. A method for statistically multiplexing a plurality of programs, the method comprising:
determining R$_{channel}$, wherein R$_{channel}$ is a constant total bit rate for the plurality of programs;
determining C$_{l,Ff,picType}$, wherein C$_{l,Ff,picType}$ is a complexity for a picture in the plurality of programs,
determining T$_{l,Ff,picType}$, wherein T$_{l,Ff,picType}$ is a bit allocation for the picture in the plurality of programs, based on C$_{l,Ff,picType}$ and R$_{channel}$;
encoding the plurality of programs using a plurality of encoders, a combined encoder buffer, and T$_{l,Ff,picType}$ to form a plurality of variable bit rate (VBR) compressed bit streams, wherein the encoding further comprises preventing an overflow and an underflow of the combined encoder buffer; and
multiplexing the plurality of VBR compressed bit streams to form a single constant bit rate (CBR) bit stream,
wherein preventing the overflow and the underflow of the combined encoder buffer comprises:
determining an upper boundary of T$_{l,Ff,picType}$ for the combined encoder buffer;
determining a lower boundary of T$_{l,Ff,picType}$ for the combined encoder buffer;
determining whether T$_{l,Ff,picType}$ is within the upper boundary and the lower boundary, and
in response to a determination that T$_{l,Ff,picType}$ is not within the upper boundary or the lower boundary, capping T$_{l,Ff,picType}$ to the upper boundary or the lower boundary, by setting T$_{l,Ff,picType}$ wherein:

$$T_{l,n} = \begin{cases} T_{l,n} \times (\Delta_{n+1} R_{channel} - B_n^e) / \sum_{l=1}^{L} T_{l,n} \\ T_{l,n} \times (B_{max}^e - B_n^e) / \sum_{l=1}^{L} T_{l,n} \\ T_{l,n} \end{cases}$$

$$\text{if } \sum_{l=1}^{L} T_{l,n} < \Delta_{n+1} R_{channel} - B_n^e$$

$$\text{if } \sum_{l=1}^{L} T_{l,n} > B_{max}^e - B_n^e$$

otherwise, wherein B$_{max}^e$ is a capacity of the combined encoder buffer, B$_n^e$ is a fullness of the combined encoder buffer at picture instant t$_n$, and R$_{channel}$ is a CBR output of the combined encoder buffer.

6. A statistical multiplexing (stat mux) system for statistically multiplexing a plurality of programs, the stat mux system comprising:
a stat mux rate controller including a circuit configured to determine
R$_{channel}$, wherein R$_{channel}$ is a constant total bit rate for the plurality of programs,
C$_{l,Ff,picType}$, wherein C$_{l,Ff,picType}$ is a complexity for a picture in the plurality of programs, and
T$_{l,Ff,picType}$, wherein T$_{l,Ff,picType}$ is a bit allocation for the picture in the plurality of programs, based on C$_{l,Ff,picType}$ and R$_{channel}$;
a plurality of encoders configured to encode the plurality of programs using a combined encoder buffer, and T$_{l,Ff,picType}$ to form a plurality of variable bit rate (VBR) compressed bit streams; and
a multiplexer configured to multiplex the plurality of VBR compressed bit streams to form a single constant bit rate (CBR) bit stream,
wherein the stat mux rate controller is further configured to:
determine W, wherein W is a size of a sliding window in seconds;
determine T$_W$, wherein T$_W$ is a nominal number of bits for the sliding window, based on W and R$_{channel}$;
apply the sliding window to encode the plurality of programs at t$_n$, wherein t$_n$ is a current instant; and
slide the sliding window along a time domain, wherein to slide the sliding window the stat mux rate controller
determines R, wherein R is a number of bits for the sliding window, initially set equal to T$_W$ for to t$_n$<W,
after a picture is encoded from the plurality of programs, removes the picture from the sliding window and moves a new picture into the sliding window, and updates R to a value determined by an equation $$R = T_W + \left( T_W - \sum_{t_{n'} \in [t_n - W, t_n]} \sum_{l=1}^{L} R_{l,n'} \right),$$

wherein R$_{l,n'}$ is an actual number of bits generated for a picture of program index 1 at instant t$_{n'}$, and R$_{l,n'}$ is summed over all L programs, wherein L is a total number of the plurality of programs, and over a period from t$_n$−W to t$_n$.

7. The stat mux system of claim 6, wherein,
W=LCM(FrameRate$_l$,l=1toL), wherein W is a size of a sliding window in seconds
wherein LCM(FrameRate$_l$,l=1toL) is a least common multiple of L frame rates for the plurality of programs.

8. The stat mux system of claim 6, wherein $$T_{l,Ff,picType} = \frac{\alpha_{l,Ff}\beta_{l,Ff}\gamma_{l,Ff,picType}C_{l,Ff,picType}}{\sum_{l=1}^{L}\sum_{Ff}\sum_{picType\in} n_{l,Ff,picType}\alpha_{l,Ff}\beta_{l,Ff}\gamma_{l,Ff,picType}C_{l,Ff,picType}} R$$

wherein Ff∈{frame, field} indicates a frame or field picture, picType∈{I, P, $B_s$, B} indicates a picture type of I, P, Bs or B, $n_{l,Ff,picType}$ indicates a number of pictures of picType∈{I, P, $B_s$, B} in Ff∈{frame, field} for program l in the sliding window, $\alpha_{l,Ff}$ is a constant factor for addressing a spatial resolution of program l, $\beta_{l,Ff}$ is a quality weighting factor for program l, and $\gamma_{l,Ff,picType}$ is a constant factor used to compensate for the picture type picType∈{I, P, $B_s$, B} in Ff∈{frame, field} for program l.

9. A statistical multiplexing (stat mux) system for statistically multiplexing a plurality of programs, the stat mux system comprising:
  a stat mux rate controller including a circuit configured to determine
    $R_{channel}$, wherein $R_{channel}$ is a constant total bit rate for the plurality of programs,
    $C_{l,Ff,picType}$, wherein $C_{l,Ff,picType}$ is a complexity for a picture in the plurality of programs, and
    $T_{l,Ff,picType}$, wherein $T_{l,Ff,picType}$ is a bit allocation for the picture in the plurality of programs, based on $C_{l,Ff,picType}$ and $R_{channel}$;
  a plurality of encoders configured to encode the plurality of programs using a combined encoder buffer, $T_{l,Ff,picType}$ to form a plurality of variable bit rate (VBR) compressed bit streams; and
  a multiplexer configured to multiplex the plurality of VBR compressed bit streams to form a single constant bit rate (CBR) bit stream,
  wherein the stat mux rate controller is further configured to:
    determine an upper boundary of $T_{l,Ff,picType}$ for the combined encoder buffer;
    determine a lower boundary of $T_{l,Ff,picType}$ for the combined encoder buffer; and
    determine whether $T_{l,Ff,picType}$ is within the upper boundary and the lower boundary, and
      in response to a determination that $T_{l,Ff,picType}$ is not within the upper boundary and the lower boundary, to cap $T_{l,Ff,picType}$ to the upper boundary or the lower boundary,
  wherein the stat mux rate controller is configured to determine $T_{l,n}=T_{l,Ff,picType}$ within the upper boundary and the lower boundary:

$$T_{l,n} = \begin{cases} \sum_{n'=n}^{n+N'} R^c_{l,n'} - B^e_{l,n} - B^d_{max} \\ \sum_{n'=n}^{n+N'-1} R^c_{l,n'} - B^e_{l,n} \\ T_{l,n} \end{cases}$$

if $T_{l,n} < \sum_{n'=n}^{n+N'} R^c_{l,n'} - B^e_{l,n} - B^d_{max}$ if $T_{l,n} > \sum_{n'=n}^{n+N'-1} R^c_{l,n'} - B^e_{l,n}$ otherwise, wherein $B_{max}^e$ is a capacity of the combined encoder buffer, $B_n^e$ is a fullness of the combined encoder buffer at picture instant $t_n$, and $R_{channel}$ is a CBR output of the combined encoder buffer.

10. A non-transitory computer readable storage device storing at least one computer program that when executed by a computer system performs a method comprising:
  determining $R_{channel}$, wherein $R_{channel}$ is a constant total bit rate for the plurality of programs;
  determining $C_{l,Ff,picType}$, wherein $C_{l,Ff,picType}$ is a complexity for a picture in the plurality of programs,
  determining $T_{l,Ff,picType}$, wherein $T_{l,Ff,picType}$ is a bit allocation for the picture in the plurality of programs, based on $C_{l,Ff,picType}$ and $R_{channel}$;
  encoding the plurality of programs using a plurality of encoders, a combined encoder buffer, and $T_{l,Ff,picType}$ to form a plurality of variable bit rate (VBR) compressed bit streams; and
  multiplexing the plurality of VBR compressed bit streams to form a single constant bit rate (CBR) bit stream;
  determining W, wherein W is a size of a sliding window in seconds;
  determining $T_W$, wherein $T_W$ is a nominal number of bits for the sliding window, based on W and $R_{channel}$;
  applying the sliding window to encode the plurality of programs at $t_n$, wherein $t_n$ is a current instant; and
  sliding the sliding window along a time domain, wherein the sliding includes
    determining R, wherein R is a number of bits for the sliding window, initially set equal to $T_W$ for $t_n<W$,
    after a picture is encoded from the plurality of programs, removing the picture from the sliding window and moving a new picture into the sliding window, and updating R to a value determined by an equation $$R = T_W + \left(T_W - \sum_{t_{n'}\in[t_n-W,t_n]}\sum_{l=1}^{L} R_{l,n'}\right),$$

wherein $R_{l,n'}$ is an actual number of bits generated for a picture of program index l at instant $t_{n'}$, and $R_{l,n'}$ is summed over all L programs, wherein L is a total number of the plurality of programs, and over a period from $t_n-W$ to $t_n$.

* * * * *